UNITED STATES PATENT OFFICE.

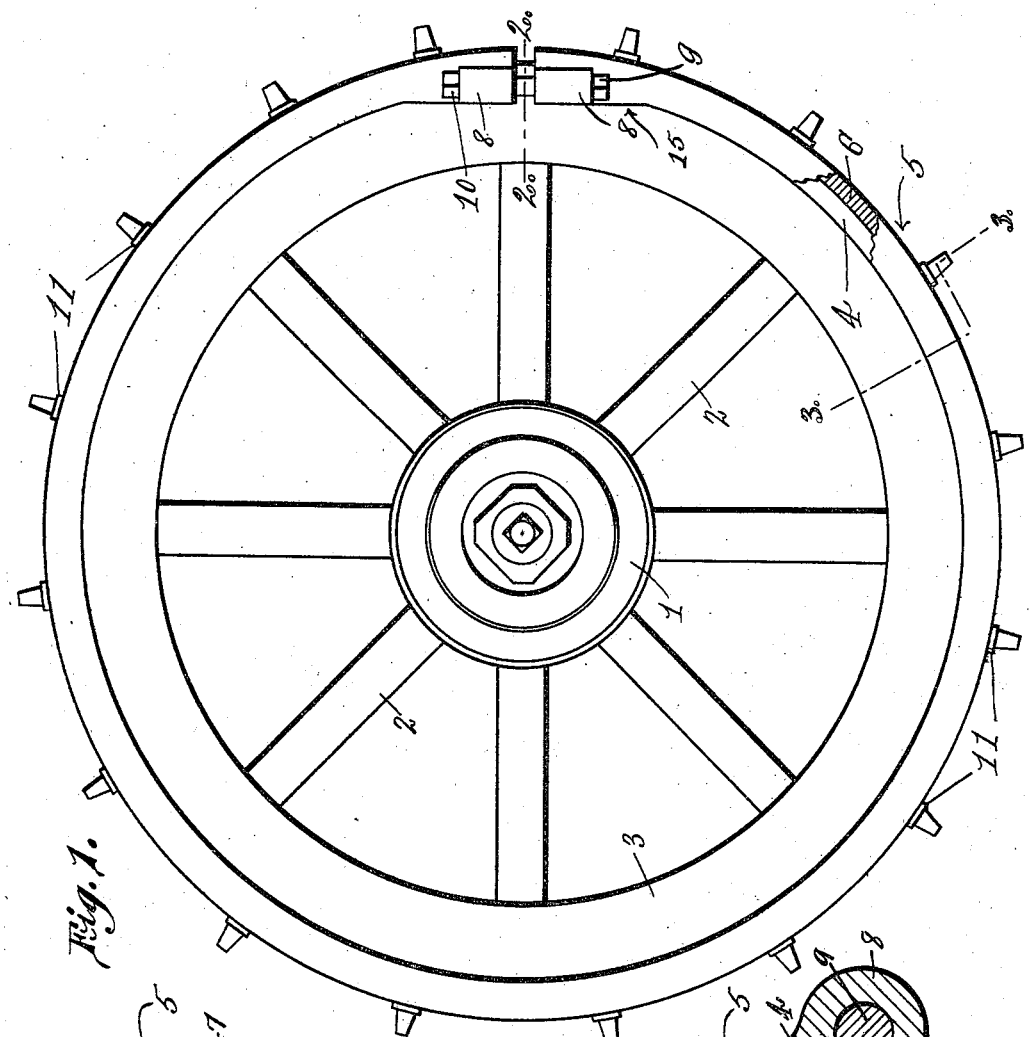

EDWARD JACOB HAHN, OF MERRILL, IOWA.

DETACHABLE VEHICLE-TIRE.

1,245,335.  Specification of Letters Patent.  Patented Nov. 6, 1917.

Application filed May 14, 1917. Serial No. 168,470.

*To all whom it may concern:*

Be it known that I, EDWARD J. HAHN, a citizen of the United States, residing at Merrill, in the county of Plymouth, and State of Iowa, have invented a new and useful Detachable Vehicle-Tire, of which the following is a specification.

The device forming the subject matter of this application is a circular, trough-shaped shoe, adapted to be mounted on the wheels of passenger vehicles, farm wagons, trucks, buggies, and vehicles of all kinds, which are not provided with motor driven wheels. The function of the improvement for which Letters Patent are asked, is to prevent side skidding, and to provide a rough-lock brake which will be effective on icy hills and elsewhere when the wheels of the vehicle are forcibly held against rotation.

The invention aims to provide a structure of the kind mentioned which will be simple in construction, and capable of being mounted readily on a wheel: it provides novel means for holding the shoe on the wheel, and to provide a structure of the kind above mentioned, the spurs of which may be renewed readily when worn or broken.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a wheel equipped with the device forming the subject matter of this application, parts being broken away;

Fig. 2 is a cross section approximately on the line 2—2 of Fig. 1; and

Fig. 3 is a cross section taken approximately on the line 3—3 of Fig. 1.

In the drawings, there is shown a wheel comprising in the present instance, but not of necessity, a hub 1 from which radiate spokes 2 assembled with a felly 3 carrying the usual metallic tire 4.

In putting the present invention into practice, there is provided a metal shoe 5 which is trough-shaped in cross section, the shoe including a base 6 and side flanges 7. The shoe 5 preferably is fashioned in one piece, and has sufficient resiliency to enable it to be placed about the tire 4 of the wheel, the base 6 abutting against the tread surface of the tire 4, and the flanges 7 engaging the side edges of the tire, as clearly indicated in Fig. 3. The ends of the shoe are spaced slightly, as shown in Fig. 1, and are provided at their sides with sockets 8 through which bolts 9 are passed, the bolts 9 carrying nuts 10. It is obvious that by tightening up the nuts 10, the shoe 5 will be held upon the tire 4.

The invention includes any desired number of spurs 100 made of a good grade of iron and having, each, a hard steel center 60, the spurs having wrench heads 11 and provided with threaded shanks 12 received in openings 14 formed in the base 6 of the shoe. When the shanks 12 are threaded into the openings 14, by means of a wrench applied to the head 11, the inner ends of the shanks 12 bear against the tire 4 and prevent the shoe 5 from creeping circumferentially on the tire 4.

The device disclosed in this application is simple in construction and of few parts, but it will be found thoroughly efficient for the objects hereinbefore pointed out. When any of the spurs 10 become worn or broken, the worn or broken spurs may be threaded out of the base 5 of the shoe, and new spurs may be substituted therefor.

All portions of the structure, preferably, are made of metal.

It is to be observed that at the ends of the shoe 5, the flanges 7 are broadened slightly as shown at 15, thereby enabling the sockets 8 to be spaced more widely than would otherwise be possible, from the outer thread surface of the shoe. Owing to this construction, the sockets 8 are not pressed into the ground, at each rotation of the wheel, as would be the case if the flanges 7 were not broadened as indicated at 15, the sockets 8 being located, as a consequence, close to the thread portion of the shoe and not as shown in the drawings.

Having thus described the invention, what is claimed is:—

A tire shoe of circular form, having relatively movable ends; a tightening device connecting said ends; and traction spurs projecting beyond the outer curve of the shoe and threaded into the shoe, the threaded portions of the spurs being of sufficient length to permit the inner ends of the spurs to project beyond the inner curve of the shoe to form a tire-engaging holding-means.

In testimony that I claim the foregoing as my own, I have hereto affixed my signature in the presence of two witnesses.

EDWARD JACOB HAHN.

Witnesses:
G. H. BROWN,
P. S. TRONSRUE.

Copies of this patent may be obtained for five cents each, by addressing the "Commissioner of Patents, Washington, D. C."